(12) United States Patent
Ghafourifar

(10) Patent No.: US 10,587,585 B2
(45) Date of Patent: Mar. 10, 2020

(54) SYSTEM AND METHOD OF PRESENTING DYNAMICALLY-RENDERED CONTENT IN STRUCTURED DOCUMENTS

(71) Applicant: Entefy Inc., Palo Alto, CA (US)

(72) Inventor: Alston Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 270 days.

(21) Appl. No.: 15/396,480

(22) Filed: Dec. 31, 2016

(65) Prior Publication Data

US 2018/0191686 A1 Jul. 5, 2018

(51) Int. Cl.
*H04L 9/14* (2006.01)
*H04L 29/06* (2006.01)

(52) U.S. Cl.
CPC .......... *H04L 63/0428* (2013.01); *H04L 9/14* (2013.01); *H04L 63/06* (2013.01); *H04L 63/105* (2013.01)

(58) Field of Classification Search
CPC ..... H04L 63/0428; H04L 9/0861; H04L 9/14; H04L 9/30; H04L 63/06; H04L 63/105
USPC ........................................................ 713/168
See application file for complete search history.

(56) References Cited

U.S. PATENT DOCUMENTS

| | | | |
|---|---|---|---|
| 6,067,399 A | 5/2000 | Berger | |
| 8,196,182 B2 * | 6/2012 | Sussland | G06F 21/445 380/283 |
| 8,744,143 B2 | 6/2014 | Chen | |
| 8,799,022 B1 | 8/2014 | O'Brien | |
| 9,264,581 B2 | 2/2016 | Lerios | |
| 9,350,914 B1 | 5/2016 | Kaur | |
| 9,426,387 B2 | 8/2016 | Jung | |
| 9,571,785 B2 | 2/2017 | Farrell | |
| 9,590,949 B2 | 3/2017 | Murphy | |
| 9,646,398 B2 | 5/2017 | Yuan | |
| 9,749,321 B2 | 8/2017 | Farnsworth | |
| 9,798,889 B1 * | 10/2017 | Karpel | G06F 21/6227 |

(Continued)

OTHER PUBLICATIONS

Goyal, et al., "Attribute-Based Encryption for Fine-Grained Access Control of Encrypted Data," '06, Oct. 30-Nov. 3, 2006, Alexandria, Virginia, USA.

*Primary Examiner* — Harunur Rashid
*Assistant Examiner* — Sakinah White Taylor
(74) *Attorney, Agent, or Firm* — Haynes and Boone, LLP

(57) ABSTRACT

Users desire a system that provides for the setting of custom, content-agnostic, permissions at a message, document, and/or sub-document-level through a communications network. Such a system may also allow the user to apply customized privacy settings and encryption keys differently to particular parts of a document. Customized encryption keys may be applied to particular parties (or groups of parties) to enhance the security of the permissions settings. In the case of structured document file types, dynamically-rendered content can present a challenge to accurately display to viewers, because one or more of the document's values referred to by the dynamically-rendered content may be encrypted or otherwise unavailable to the recipient—even though the dynamically-rendered content itself is viewable by the recipient. Systems are presented herein to handle the presentation of dynamically-rendered content in structured documents, while preserving the sender's intent to not disclose certain underlying or related information in the document.

22 Claims, 10 Drawing Sheets

(56) References Cited

U.S. PATENT DOCUMENTS

| | | |
|---|---|---|
| 2001/0055396 A1 | 12/2001 | Jevans |
| 2002/0078361 A1 | 6/2002 | Giroux |
| 2003/0105719 A1 | 6/2003 | Berger |
| 2003/0108240 A1 | 6/2003 | Gutta |
| 2005/0002585 A1 | 1/2005 | Brauckmann |
| 2005/0066265 A1* | 3/2005 | Kotler .................. G06F 17/211 715/212 |
| 2006/0017747 A1 | 1/2006 | Dawson |
| 2008/0140578 A1 | 6/2008 | Felt |
| 2008/0193018 A1 | 8/2008 | Masuda |
| 2008/0267403 A1 | 10/2008 | Boult |
| 2009/0207269 A1 | 8/2009 | Yoda |
| 2009/0244364 A1 | 10/2009 | Nonogaki |
| 2010/0103193 A1 | 4/2010 | Abe |
| 2010/0246890 A1 | 9/2010 | Ofek |
| 2011/0150217 A1 | 6/2011 | Kim |
| 2013/0011068 A1 | 1/2013 | Albouyeh |
| 2013/0024901 A1 | 1/2013 | Sharif-Ahmadi |
| 2013/0093829 A1 | 4/2013 | Rosenblatt |
| 2013/0156263 A1 | 6/2013 | Yamashita |
| 2013/0202109 A1 | 8/2013 | Ducharme |
| 2014/0112534 A1 | 4/2014 | Sako |
| 2014/0189483 A1* | 7/2014 | Awan ...................... H04L 63/08 715/212 |
| 2015/0006390 A1 | 1/2015 | Aissi |
| 2015/0016602 A1 | 1/2015 | De Los Reyes |
| 2015/0033362 A1 | 1/2015 | Mau |
| 2015/0113661 A1 | 4/2015 | Mishra |
| 2015/0371049 A1 | 12/2015 | Xavier |
| 2015/0371613 A1 | 12/2015 | Patel |
| 2016/0034704 A1 | 2/2016 | Shim |
| 2016/0217300 A1 | 7/2016 | Kim |
| 2016/0241627 A1 | 8/2016 | Ortega |
| 2016/0283096 A1 | 9/2016 | Yao |
| 2016/0292494 A1 | 10/2016 | Ganong |
| 2016/0294781 A1 | 10/2016 | Ninan |
| 2016/0316219 A1 | 10/2016 | Yuan |
| 2017/0061155 A1 | 3/2017 | Gordon |
| 2017/0220816 A1 | 8/2017 | Matusek |
| 2018/0124055 A1 | 5/2018 | Chen |

* cited by examiner

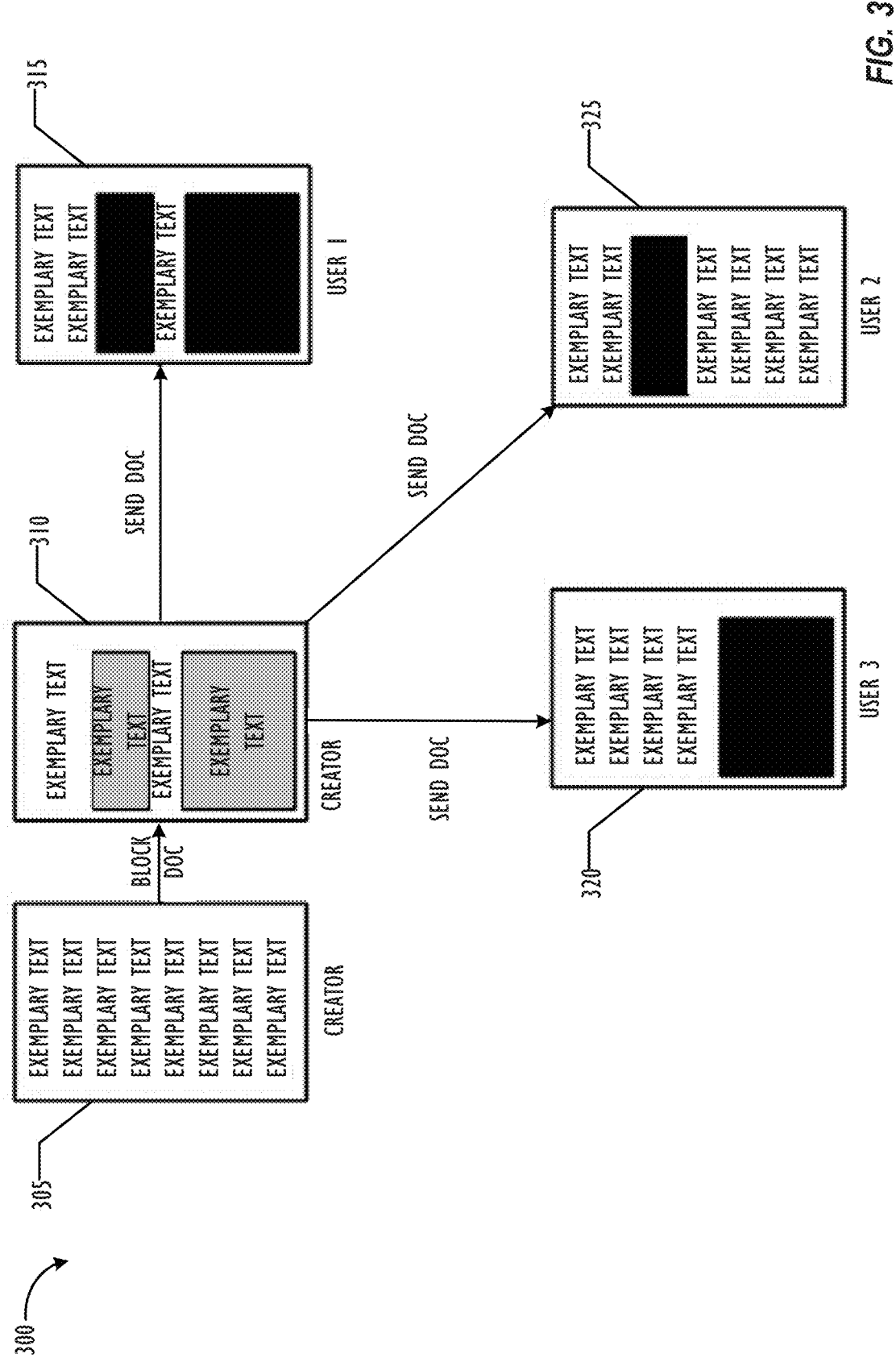

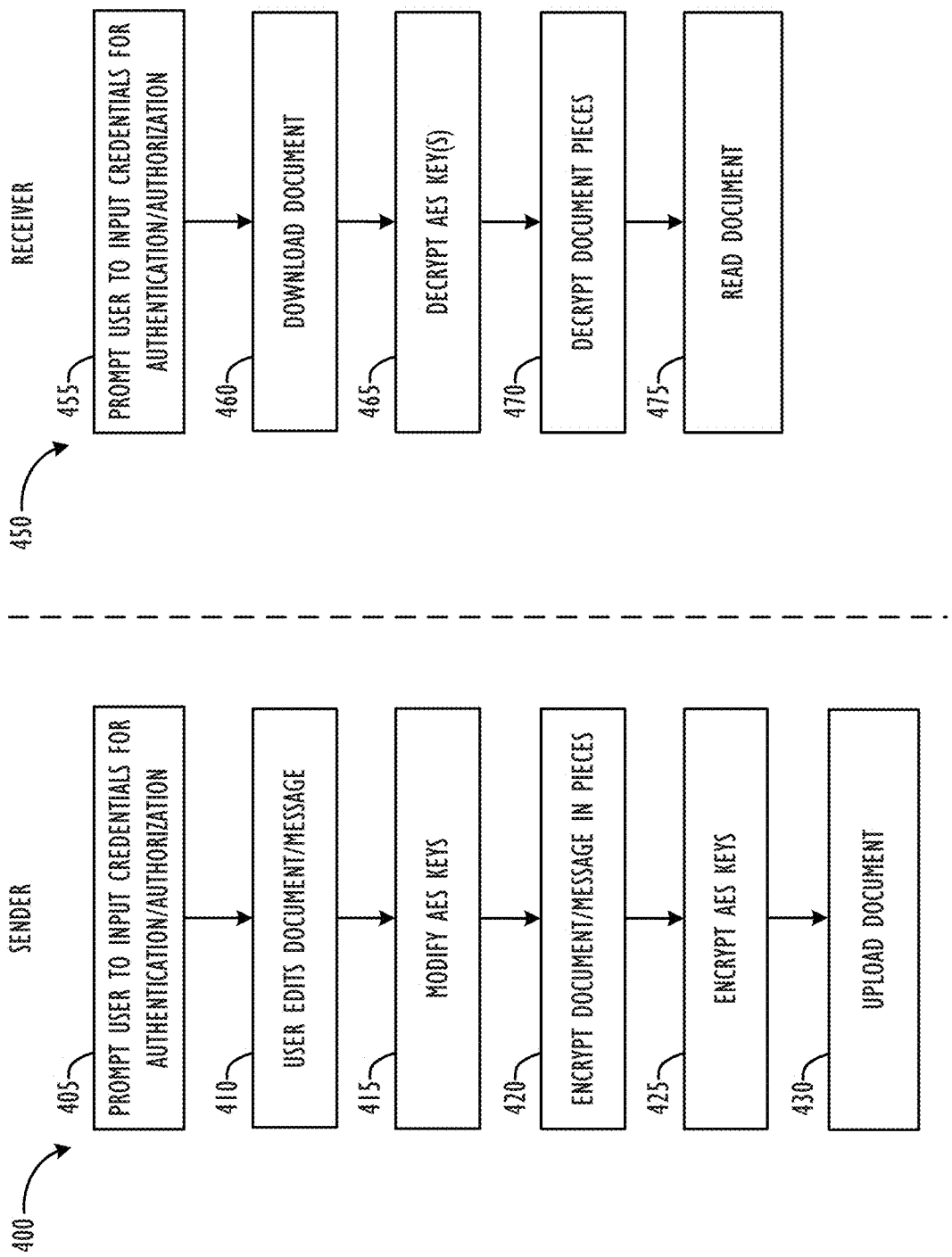

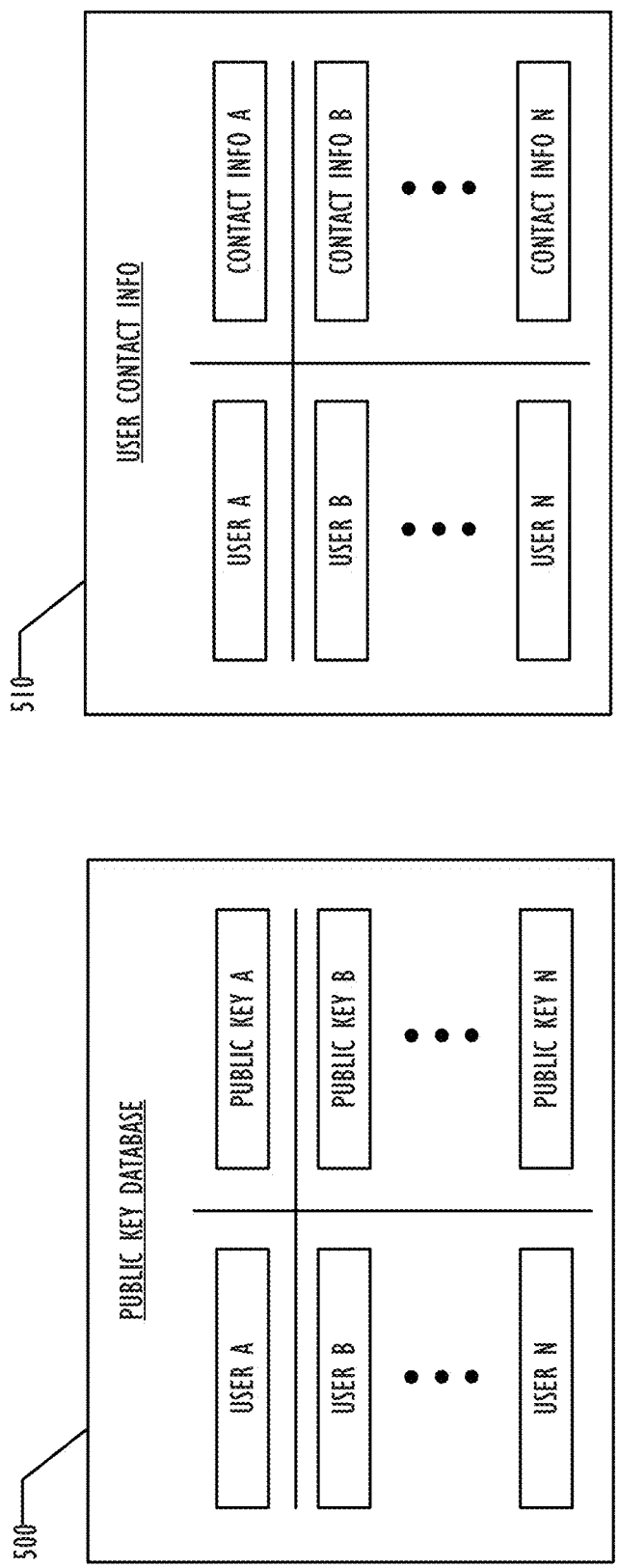

SYSTEM AND METHOD OF PRESENTING DYNAMICALLY-RENDERED CONTENT IN STRUCTURED DOCUMENTS

CROSS-REFERENCE TO RELATED APPLICATION

This application is related to the commonly-assigned, co-pending U.S. patent application Ser. No. 14/584,329 ("the '329 application), filed Dec. 29, 2014, and entitled, "System and Method of Determining User-Defined Permissions Through a Network." The '329 application is hereby incorporated by reference in its entirety.

TECHNICAL FIELD

This disclosure relates generally to systems, methods, and computer readable media for determining user-defined, content-agnostic document and message permissions through a network, and especially for structured documents (e.g., documents that may be represented using a markup language), which may contain both dynamically-rendered content and statically-rendered content.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, YMSG, etc.) has led to increased concerns regarding the safety and security of documents and messages that are sent over networks. Users desire a system that provides for the setting of custom, e.g., user-defined, content-agnostic permissions at a message-, document-, and/or sub-document—(i.e., a part of the document that comprises less than the entire document) level through a communications network. Such a system would allow customized privacy settings to be specified at various levels of social distance from the user sending the document or message (e.g., public, private, followers, groups, Level-1 contacts, Level-2 contacts, Level-3 contacts, etc.). Such a system may also allow the user to apply customized privacy settings and encryption keys differently to particular parts of a document, e.g., making a first part of a document available only to a first class of users and other parts of the document available to the first class of users and a second class of users.

Thus, a system for providing Adaptive Privacy Controls (APC) is described herein. APC comprises a user-controllable or system-generated, intelligent privacy system that can limit viewing, editing, and re-sharing privileges for files and other digital objects of all types stored in a compatible system (e.g., message objects, user profile fields, documents, etc.). APC allows users to share whatever information they want with whomever they want, while keeping others from accessing such information via assorted rights management techniques and/or encryption processes that can be initiated by user command or via system intelligence on entire objects or portions of objects. APC techniques may be applied to individuals, pre-defined groups, and/or ad-hoc groups. Customized encryption keys may further be applied to particular parties or groups of parties to enhance the security of the permissions settings.

APC may also be used to apply privacy settings to only particular parts of a document. For example, User A in an organization may need to see the entire content of the organization's annual report drafts, but other users in the organization may only need to see a version that has sensitive financial/pro-forma data redacted. For example, pages 1-20 of the annual report would be available to User A, but only pages 1-19 would be available to the other users.

Thus, according to some embodiments, the network-based, user-defined, content-agnostic (i.e., agnostic as to both format and subject matter) document and message permissions systems, methods, and computer readable media described herein may provide a seamless, intuitive user interface (e.g., using touch gestures or mouse input) allowing a user to block out particular areas of interest in a document or message from particular recipients or groups of recipients, as well as to specify privacy and permissions settings for a single document or message—or across all documents owned by the user.

The protections offered by APC techniques may, however, be complicated when applied to structured document file formats and/or file types that may, e.g., be represented by a markup language. In the case of spreadsheet documents or other Extensible Markup Language (XML)-based file types, dynamically calculated content can present a challenge to accurately display to unauthorized or 'out-of-system' viewers, because APC's encryption of document content at the individual cell- or value-level can create corrupted regions within formulas, charts, features, or other dynamically-rendered content that relies on or refers to the encrypted content's value(s) in order to be rendered correctly. For example, if APC protection techniques are applied to one or multiple spreadsheet cells that are referenced in a formula of a second spreadsheet cell, the second cell's formula output will likely contain a Reference Error when viewed by an unauthorized or 'out-of-system' viewer and thus appear invalid—even if the sender had actually intended the recipient to be able to see the value of the second cell (i.e., the value of the second cell at least as of the time the sender sent the document to the recipient).

The subject matter of the present disclosure is directed to overcoming, or at least reducing the effects of, one or more of the problems set forth above. To address these and other issues, techniques that enable the setting of user-defined, content-agnostic permissions at a message-, document-, and/or sub-document-level through a communications network—including for structured document file types that may contain both dynamically-rendered content and statically-rendered content—are described herein.

BRIEF DESCRIPTION OF THE DRAWINGS

FIG. 3 shows an example of a sub-document-level permissions scheme with custom recipient-based privacy settings, according to one or more disclosed embodiments.

FIG. 4 shows a pair of flowcharts illustrating a method for utilizing an APC process from both the sender and receiver perspective, according to one or more disclosed embodiments.

FIG. 5 shows an example of customized privacy and permissions setting using encryption keys, according to one or more disclosed embodiments.

DETAILED DESCRIPTION

Disclosed are systems, methods, and computer readable media for creating user-defined, content-agnostic, custom privacy settings for documents, sub-documents, and messages that limit sharing privileges for files that are sent using the custom privacy settings. More particularly, but not by way of limitation, this disclosure relates to systems, methods, and computer readable media to permit users of the permissions system to combine customized permissions settings at the document and sub-document levels with customized encryption keys to achieve a greater level of control over who their data is shared with and exactly what information is shared. The disclosed techniques may be applied to files of all formats, including structured document file formats that may contain both dynamically-rendered content and statically-rendered content.

Figure 1A:
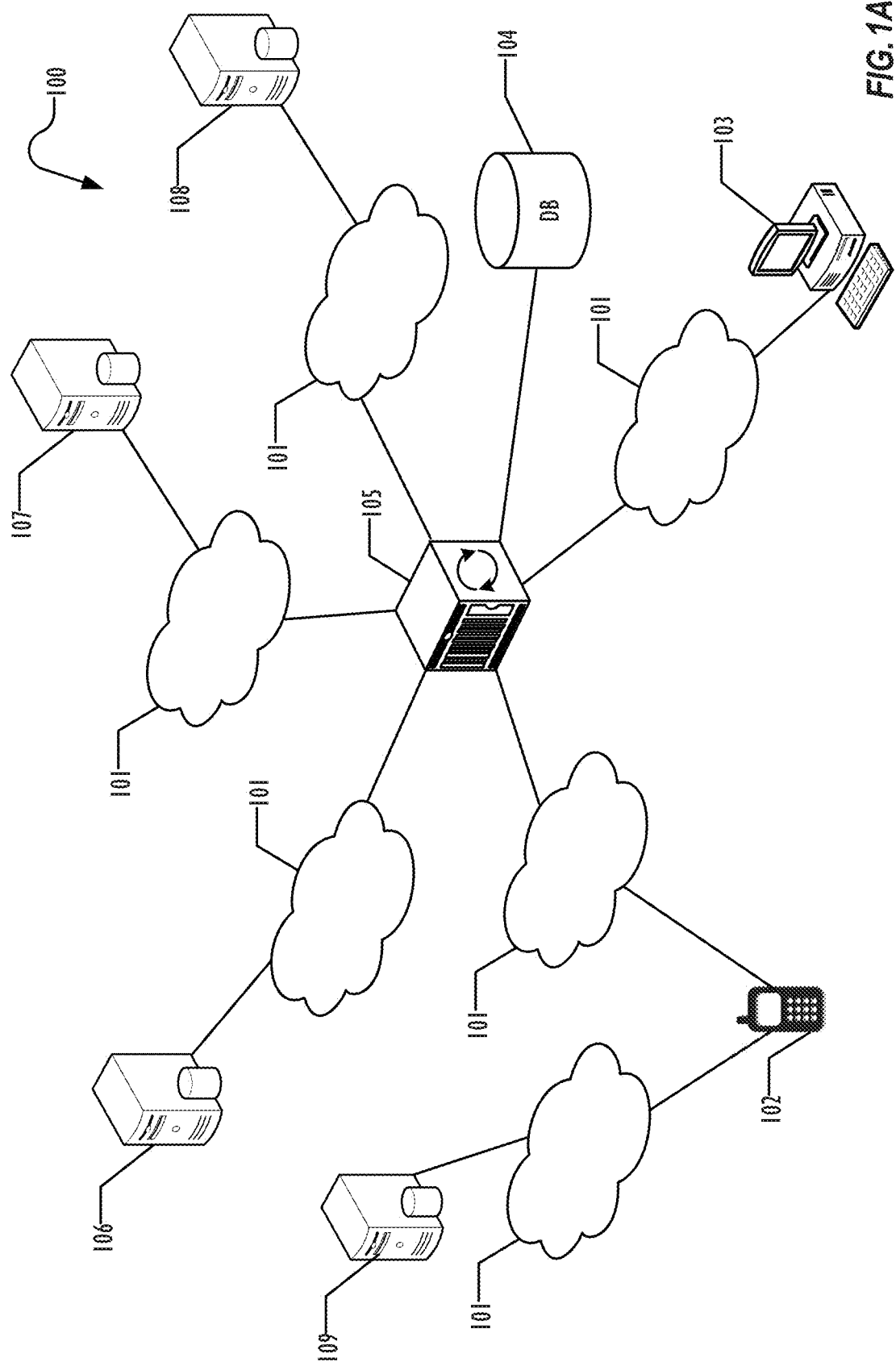
FIG. 1A is a block diagram illustrating a server-entry point network architecture infrastructure, according to one or more disclosed embodiments.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a represents a third party instant message server (e.g., a YAHOO!® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' or 'on-system' users are communicating with one another via the multi-protocol, multi-format communication system itself, such communications may occur entirely via sync server 105, and third party servers 106-109 may not need to be contacted.

Figure 1B:
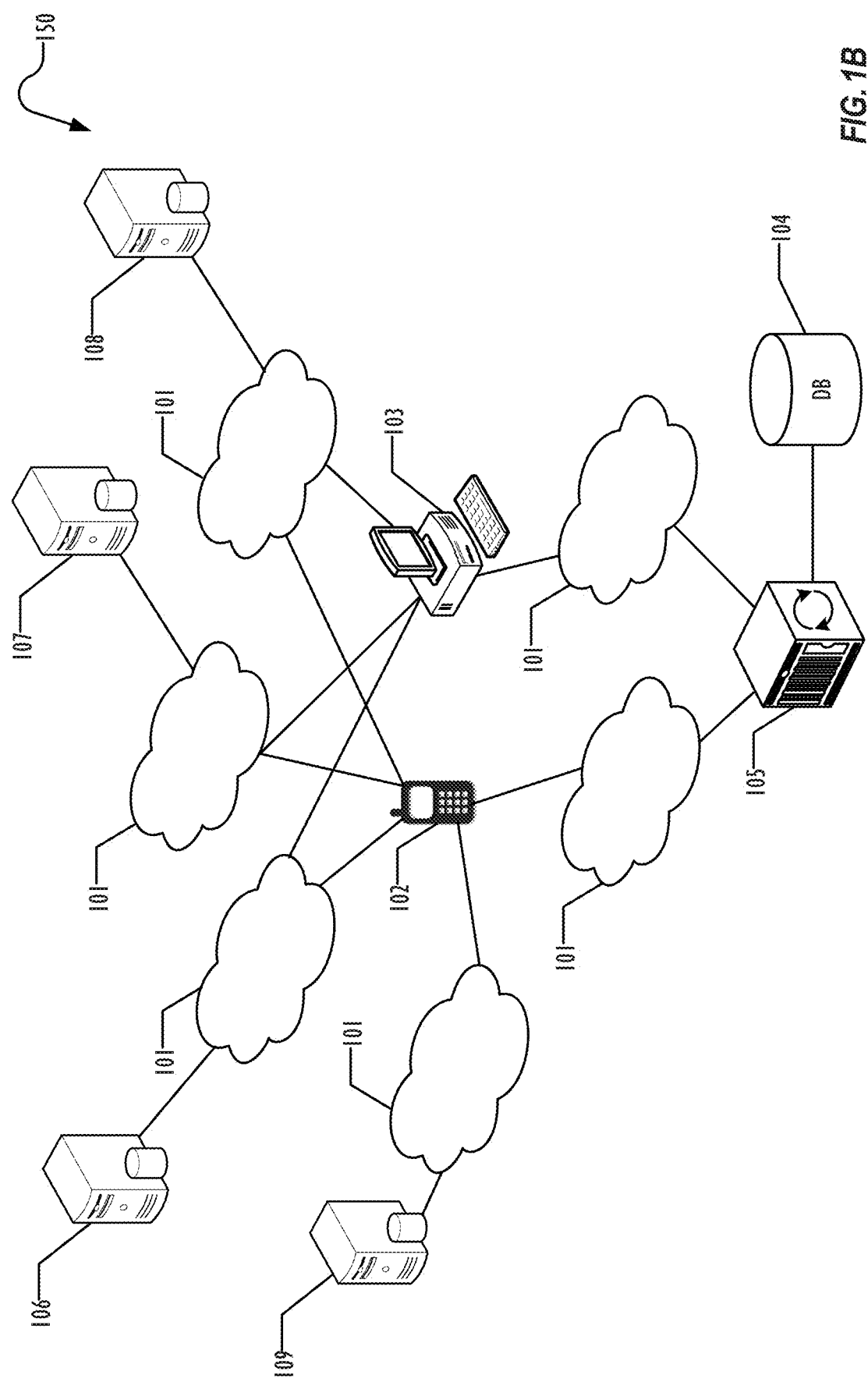
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
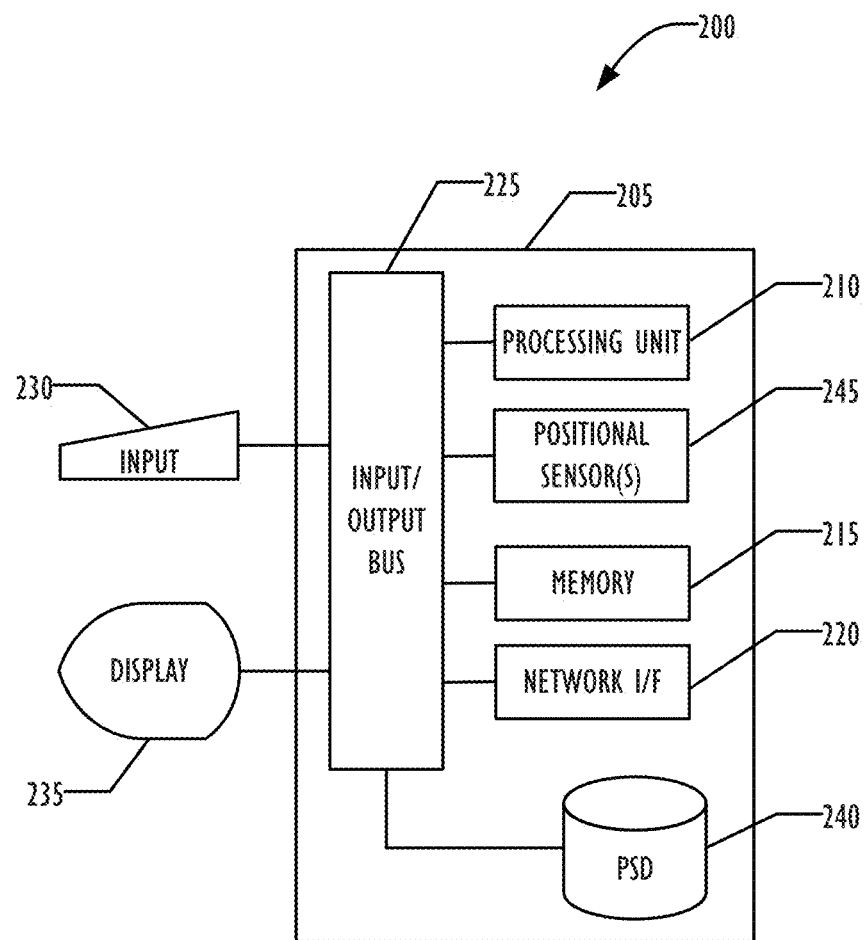
FIG. 2A is a block diagram illustrating a computer which could be used to execute the user-defined permissions approaches described herein, according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
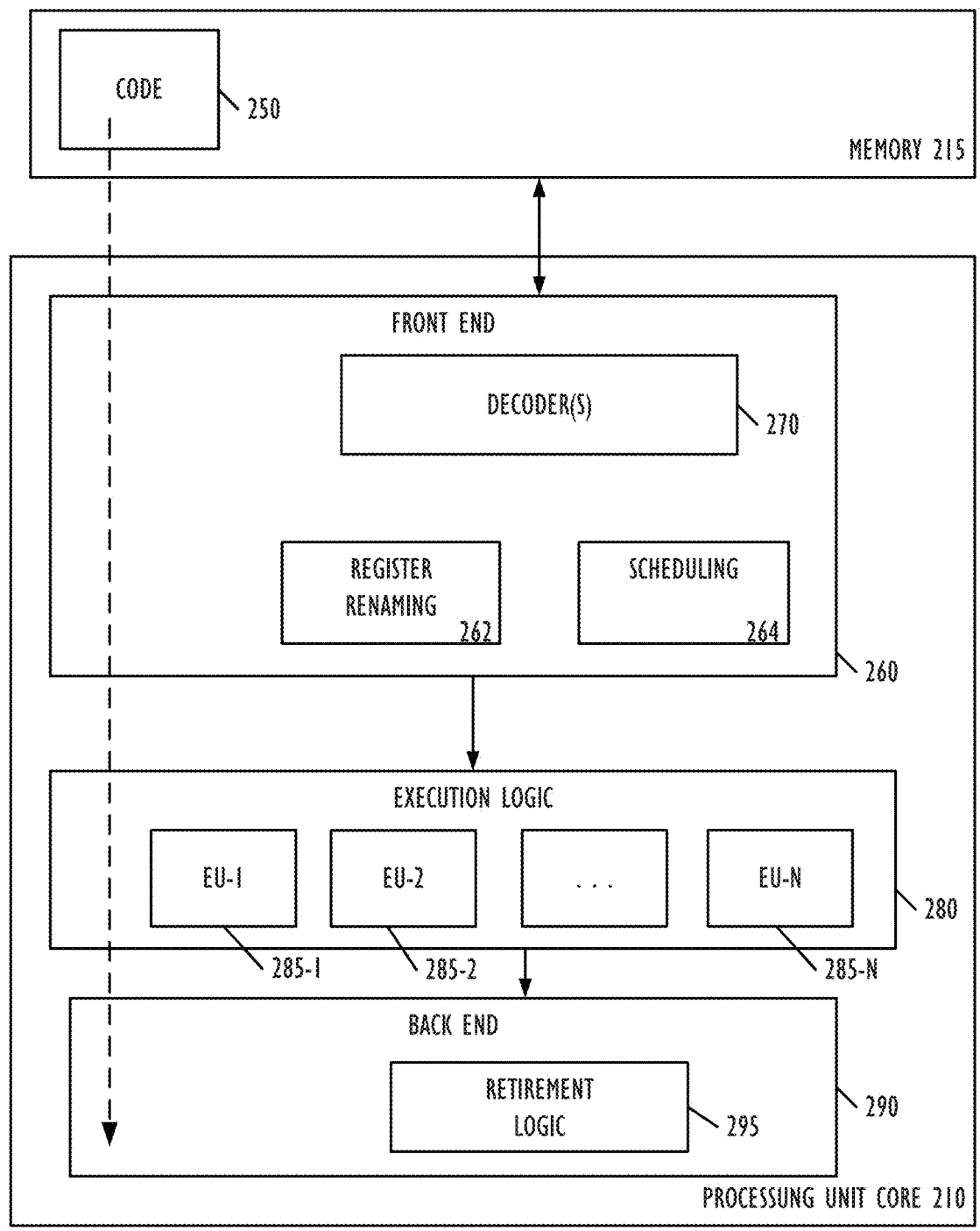
FIG. 2B is a block diagram illustrating a processor core, which may reside on a computer, according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Document and Sub-Document Level Permissions Scheme with Custom, Recipient-Based Privacy Settings According to some embodiments of a system for providing Adaptive Privacy Controls (APC), global, i.e., document-level or file-level permissions may be implemented. For example, in one scenario, a user may wish to share a document with a colleague, but not allow that colleague to pass along the document to other parties. In such a scenario, User A may use the system to send the file (e.g. using SMTP, XMPP, etc.) to the colleague, User B, while selecting the appropriate APC option(s) to limit User B's re-sharing ability. The client application or server (depending on system architecture) may then process the selected APC option(s) and protect the document with a shared password, public/private key encryption, token-controlled link, or other form of protection. User B can then receive a typical message with the attached file, held in a protected container, which requires a password (in the case of an off-system user) or private key (in the case of an on-system user). User B may also receive a typical message with a link to a token/access-controlled document for view only, download, live editing, or other such activity—each individually permissioned at User A's discretion.

If User B is an 'on-system' recipient, the system may process the shared file, use the recipient's public key to encrypt the file, and send it to the recipient in any desired format, using any desired protocol. When the recipient opens the message and attachment in a compatible application, the private key will automatically decrypt the file and open it for use. To protect against re-sharing, the system may make the file read-only (i.e., no download permissions). Any attempt on User B's part to digitally transmit the file or portions of the file to other recipients will result in the recipient receiving unusable, encrypted content.

If, instead, User B is an 'off-system' recipient, the system may process the shared file and perform any of the following actions: 1) generate a protected .zip file (or other similar container) with a password that User A may share with User B via any preferred communication protocol; 2) generate a link to a web portal that requires User B to join the system and authenticate himself or herself prior to receiving the document (e.g., by matching email address identifiers and performing standard validation processes to ensure identity).

According to other embodiments of a system for providing Adaptive Privacy Controls (APC), local, i.e., sub-document-level or sub-file-level permissions may be implemented. For example, a user may wish to share sensitive financial information contained in an Annual Report among a team. In such a scenario, User A may decide to share the Annual Report with his team, comprising User B and User C. In this scenario, User B has permission to see all of the Annual Report, but User C only has permission to view the summary worksheet on page 1 of the Annual Report. In such a scenario, APC would allow User A to share a fully-viewable document with User B and a partially-viewable version of the same document with User C. Prior to sending the file, User A could instruct the system to protect the sensitive data in the document using markup-specific substitutions.

Another exemplary situation wherein sub-document-level permissions may be employed is in the sharing of picture or video media, whereby specific sections of the media content require selective censorship, redaction, or other protection for certain recipients, in order to maintain desired privacy or security levels. In one scenario, User A, the sharer, may want to share a humorous picture with his wife (User B) and young son (User C). Knowing that the picture contains certain explicit words or imagery but is still funny even without the explicit sub-portions of the content, User A may attach the photo to a message in a capable application and use the application's selection capabilities to "block-out" the explicit sub-portions of the image. User A may then instruct the system to allow User B to view the full uncensored image, while only allowing User C to view the censored portions of the image.

For both of the exemplary sub-document permissions scenarios described above, the application can present a view of the object in question (e.g., via a compatible file viewer or image thumbnail, etc.) to the sender of the object. The sender can then use any desired form of selection input (e.g., touch gestures, mouse gestures, etc.) to indicate which content should be access-controlled. Those selections will be recorded and either processed locally or sent to a central server (depending on client capabilities), whereby the system will process the object's original source code (e.g. in XML format, MIME format, etc.), corresponding to the section or sections matching the user selection.

The section(s) in question may then be isolated (maintaining suitable markup) and replaced with a link reference or encrypted text (using any one of standard encryption practices, such as shared secrets, public/private key, etc.). The resulting "APC-enabled" object, when viewed in an authorized application, may prompt the application to attempt to contact a server to retrieve the markup text or (if encrypted) attempt to decrypt with the private key stored in the authorized application. Unsuccessful retrieval or decryption will result in the recipient only viewing "part" of the original file. Because this service requires knowledge of the markup structure of any compatible file type, all APC changes will be made while keeping the overall markup structure complete, such that the application may be opened (i.e., APC changes will not be implemented merely by removing sections of potentially important markup and thus corrupting the file).

FIG. 3 shows an example of sub-document-level permissions scheme 300 with custom recipient-based privacy settings, according to one or more disclosed embodiments. As demonstrated in the exemplary permissions scheme 300, the creator of the document 305, "Creator," creates or edits the document 305 that is to have custom permissions settings applied to it. Next, the Creator may identify particular portions of the document 305 to block out from the view of certain recipients, represented by the grayed out squares over particular portions of the document 305 as shown in element 310 in FIG. 3.

Finally, the Creator may choose to send the document 305 to three separate users (either simultaneously or at different times), with the appropriate portions blocked out for the appropriate recipients, based on, e.g., their identity, status as a member of a particular group, or their status as a follower of the Creator, etc. For example, as is shown in FIG. 3, the version of the document 305 sent to "User 1" 315 has both of the identified portions blocked out from the view of User 1. By contrast, the version of the document sent to "User 2" 320 has only the bottom portion of the two identified portions blocked out from the view of User 2, and the version of the document sent to "User 3" 325 has only the top portion of the two identified portions blocked out from the view of User 3. Such a system allows a single version of the document 305 to be stored in a central database or server, while still allowing the document to be shared to multiple recipients, with each recipient able to view only particular sub-portions of the document, based on the permissions settings specified by the creator/sender of the document and/or the identity of the particular recipient.

APC System Permissions Settings Options

Several examples of potential APC system permissions settings that may be applied to particular documents or messages are shown and described below:

Public: Visible to the world. Searchable by search engines. Auto-broadcasted to the creator's "Followers." The "followers" of a particular user may be established by the followers that have been created within the APC document permissions system itself (if the recipients are users of such a system), or may be pulled in from third-party services, such as Facebook, Twitter, LinkedIn, etc.

Followers: Notifies and is visible to all followers of the creator.

Just Me: Private setting. Viewable only by user that creates the document or message.

My Contacts: All contacts available on user's contact list. The "contacts" of a particular user may be established by the contacts that have been created within the APC document permissions system itself, or may be pulled in from third-party services or applications, such as Gmail, Yahoo! Mail, Outlook, etc.

Level 1 Contacts: All registered-user contacts who have directly connected with the creator via the APC document permissions system itself, e.g., by accepting an invitation from the creator to become a contact. This permissions setting may be thought of as being bi-directional, e.g.: 1.) User A invites User B, and User B accepts; 2.) User B invites User A, and User A accepts. In some embodiments, all "Level 1" contacts of a user may be automatically added to that user's "My Contacts" list.

Level 2 Contacts: Direct contacts of the user's Level 1 contacts.

Level 3 Contacts: Direct contacts of user's Level 2 contacts.

Groups: Users may create one or multiple custom groups for use with the APC document permissions system.

Custom: Users may manually add contacts, e.g., using an email address or name. The APC document permissions system may then auto-suggest users based on name entry (if the name is present in the user's "My Contacts" list). Documents that have a custom permissions system associated with them will then only be viewable by the particular users whose information is added to the custom authorization list for the document.

As will be understood, the settings levels described above are merely exemplary, and other ways of specifying permissions schemes may be used in particular implementations of an APC document permissions system.

FIG. 4 is a pair of flowcharts 400 and 450 showing a method for utilizing the APC process from both the sender's and receiver's perspective, according to one or more disclosed embodiments. Beginning with flowchart 400 from the sender's perspective, first, the system prompts the sender to input his or her credentials for authentication (Step 405). Next, the sender opens the document and edits the document, e.g., by highlighting a portion of the document and selecting particular recipients or groups of recipients to share access to that portion of the document with (Step 410). When finished, the sender may save the changes to the document. Next, the system modifies Advanced Encryption Standard (AES) encryption keys for each portion of the document with different permissions settings (Step 415). The AES is a specification for the encryption of electronic data established by the U.S. National Institute of Standards and Technology (NIST) in 2001. Each portion of the document with different permissions settings may then be encrypted with a different AES key (Step 420). Each AES key may then be encrypted with the recipient's public key (Step 425). Finally, the sender uploads the document to the system for transmission over the network to the desired recipients in the desired format(s) (Step 430).

Attention is now directed to flowchart 450, which shows the process from the receiver's perspective. First, the system prompts the receiver to input his or her credentials for authentication (Step 455). Next, the receiver downloads the document or message that was sent to him or her (Step 460). Next, the receiver's client device decrypts the AES keys that he is able to with his private key (Step 465). Next, the receiver uses the AES keys he obtained to decrypt the pieces of the document that he is able to (Step 470). Finally, the receiver opens the document for reading and/or writing, but can only see the portions that he or she has access to (Step 475). The remaining portions of the document remain scrambled to the receiver.

It is to be understood that, although AES encryption is discussed here, any suitable form of encryption may be utilized to encrypt the documents and/or portions of the documents. Further, any suitable key size, e.g., 128, 192, or 256 bits, may be used, based on a particular implementation of the APC system.

Customized Privacy and Permissions Setting using Encryption Keys

FIG. 5 shows an example of a customized privacy and permissions settings system using encryption keys, according to one or more disclosed embodiments. Public key database 500 comprises an association of user profiles and public keys associated with those users. User A in public key database 500 may refer to the sender in the scenario described above with reference to FIG. 4, whereas Users B-N may refer to potential desired recipients in the scenario described above with reference to FIG. 4. User contact info database 510 comprises an association of user profiles and contact information associated with those users. Again, user A in contact info database 510 may refer to the sender in the scenario described above with reference to FIG. 4, whereas Users B-N may refer to potential desired recipients in the scenario described above with reference to FIG. 4.

According to some embodiments of the customized privacy and permissions settings system described herein, users may set the recipients of a particular document or message to have a status of: "Read only," "Read and Share," or neither. The user may also set a file to be re-sharable to the public (e.g., universally sharable) or to a particular group of recipients.

According to one embodiment of a method of utilizing user-defined, content-agnostic privacy and permissions settings for document sharing, first, the user, e.g., User A as shown in FIG. 5, selects a message or document that he or she desires to send. Next, the user chooses the user or users that are his or her desired recipients for the selected message or document, e.g., User B. Next, the user contact information, e.g., "Contact Info B" in the contact info database 510 of FIG. 5, is matched to the user or users that are the desired recipients of the document. Next, each desired recipient user's information is found in the public encryption key database, e.g., "Public Key B" in public key database 500 of FIG. 5. Finally, the located public key, e.g., "Public Key B," is used to encrypt the content of the message or document that is to be sent, and the encrypted message or document is sent to each of the desired recipients, who may then use their private keys to decrypt the message or document.

Figure 6A:
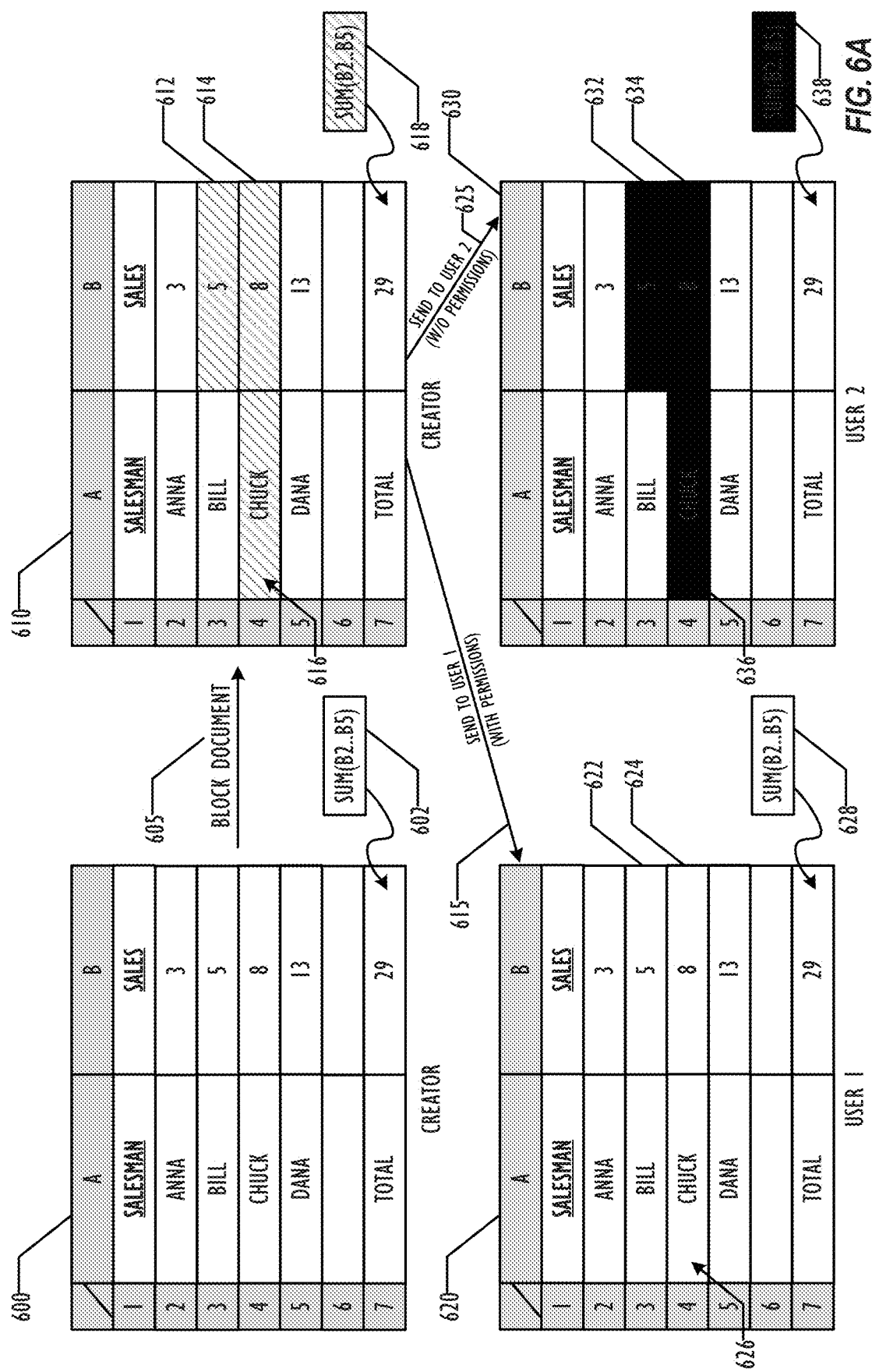
FIG. 6A shows an example of a sub-document-level permissions scheme with custom recipient-based privacy settings for a structured document having dynamically-rendered content, according to one or more disclosed embodiments.

Referring now to FIG. 6A, an example of a sub-document-level permissions scheme with custom recipient-based privacy settings for a structured document 600 having dynamically-rendered content is shown, according to one or more disclosed embodiments. As mentioned above, according to some embodiments of a system for providing APC, sub-document-level permissions may be implemented for a structured document having dynamically-rendered content. For example, a user may wish to share sensitive sales information contained in a Sales Report spreadsheet among various employees within an organization. In the example of FIG. 6A, there are four salesmen (Anna, Bill, Chuck, and Dana), who each have an associated number of sales. There is also a row in the spreadsheet (i.e., row 7) that maintains a total of all sales made by the four salesman listed in the document. In the example of FIG. 6A, the cell B7 contains the total number of sales, and is defined by backing formula 602, which is defined as a sum of the values of all the cells in the range of B2 to B5, i.e., the sum of the values of cells: B2, B3, B4, and B5. As used herein, B7 is referred to as 'dynamically-rendered' content, in the sense that, in an unprotected version of structured document 600, the value of cell B7 is re-calculated and re-rendered each time the document is opened and/or each time any value which it refers to (i.e., B2, B3, B4, or B5) is modified.

In such a scenario, the Creator may decide to share certain parts of the Sales Report with various members of his team, comprising User 1 and User 2. As shown by structured document representation 610, the Creator may indicate which parts of the document are to be protected via a document blocking process, 605. In this scenario, the protected parts of the document comprise shaded cells: B3 (612); B4 (614); and A4 (616). In this scenario, the formula backing for cell B7 (618) refers to several cells that the Creator has chosen to protect (i.e., cells B3 612 and B4 614), and, thus, the formula backing for cell B7 is also shown with shading, as an unauthorized recipient will not be able to dynamically render the content of cell B7.

As may now be more fully appreciated, an unauthorized viewer of structured document 610 without the benefits of the techniques disclosed herein would not be able to properly render the value '29' into cell B7, i.e., because two of the values that the cell B7 relies upon to dynamically determine its value, B3 612 and B4 614, would be encrypted or otherwise unavailable to the document viewing application, thus resulting in a Reference Error (or similar error message) being presented in cell B7. As will be described in greater detail below, special processing may be undertaken to ensure that the numerical content of cell B7 itself (which the Creator has not chosen to protect in this example) renders without the unwanted Reference Errors or other corruptions.

As shown by structured document representation 620, the Creator has given User 1 permission 615 to see all of the Sales Report, including cells B3 (622); B4 (624); A4 (626); and the formula backing for cell B7 (628). Thus, in this example, the contents of cell B7 (628) may be rendered dynamically by User 1's authorized document viewing application, since User 1 has been given access to both the formula backing for cell B7, as well as all of the referred-to cells by the formula backing for cell B7 (i.e., cells B2, B3, B4, and B5). In this example, then, the structured document 600 will appear to behave as normal when structured document representation 620 is viewed by User 1 in an authorized document viewing application, e.g., with the value of cell B7 updating properly if any of the values of cells B2 through B5 are updated.

However, as shown by structured document representation 630, the Creator has given User 2 permission 625 to see only the total number of sales and the amount of individual sales made by certain members of the organization, while cells B3 (632); B4 (634); A4 (636); and (by extension) the formula backing for cell B7 (638) have been APC protected, and thus hidden from User 2. Importantly, the actual numerical content of cell B7, i.e., the number value "29" has not been protected from User 2. Thus, in this example, the contents of cell B7 (628) may only be rendered statically by User 2's authorized document viewing application, i.e., reflecting a 'snapshot' of the value of cell B7 at the moment when the Creator sent 625 the structure document 600 to User 2. Since User 2 has not been given access to the formula backing for cell B7, nor has User 2 been given access to several of the referred-to cells by the formula backing for cell B7 (i.e., cells B3 and B4), User 2 will be able to see the total sales value of "29," but he will not know who the third salesman was that contributed to the sales (i.e., Chuck), and he will not know how many of the total 29 sales came from Bill and how many came from the unknown third salesman (i.e., Chuck). He will be able to determine, however, that Bill and the unknown salesman accounted for 13 sales together. Moreover, even if the referred-to cells by the formula backing for cell B7 (i.e., cells B3 and B4) were available to User 2, changing the sales values of any of the individual salesmen would not update the total sales value in cell B7 of User 2's viewing application, due to the fact that the formula backing for cell B7 is not available to User 2. (In this case, it would be fairly easy to discern that a simple sum was being performed, but, in other examples, some kind of proprietary algorithm or formulae may be applied to the data that the Creator does not wish to reveal to the Recipient, even though he does not mind the Recipient being able to view the outputted answer of the proprietary algorithm or formula). In this example, then, the structured document 600 will not appear to behave as normal when structured document representation 630 is viewed by User 2 in an authorized (or unauthorized) document viewing application. For example, as mentioned above, the value of cell B7 will not update properly if any of the values of cells B2 through B5 are updated by User 2, and the values of cells A4, B3, and B4 will not even be available for viewing or editing to User 2. However, User 2 will be able to see that, as of the snapshot in time 625 that the Creator sent the protected document to User 2, the total number of sales was "29," even though User 2 will not be able to discern exactly who each salesman is and/or how much they each contributed to the overall total of 29 sales. [It should be noted that, according to this embodiment, the same version of structured document representation 610 is sent to both User 1 and User 2. The document is then simply dynamically rendered for each recipient User, according to his or her individual permissions (e.g., by locating, decrypting, and replacing any protected content that the User has access to view at the appropriate place within the structured document's file structure.]

Figure 6B:
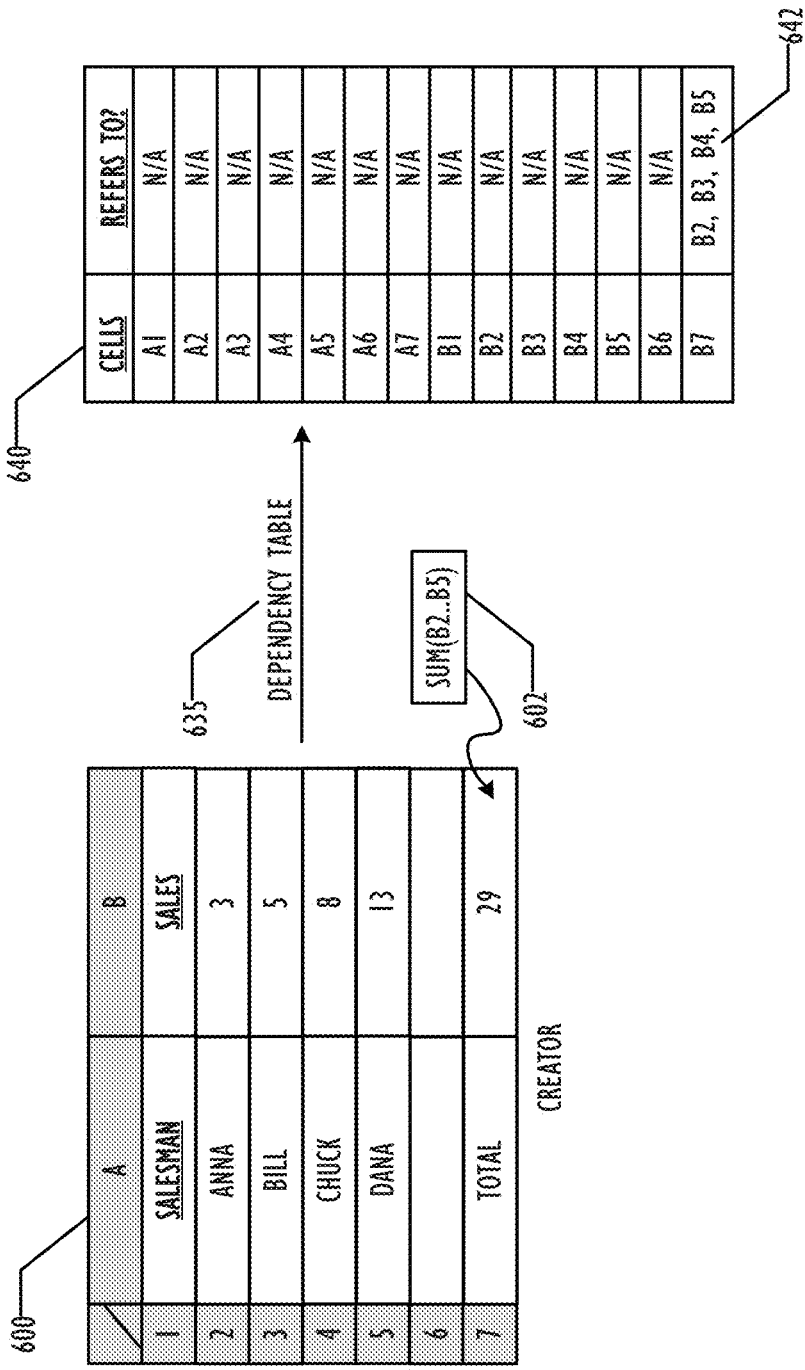
FIG. 6B shows an example of a reference table for a structured document having dynamically-rendered content, according to one or more disclosed embodiments.

Referring now to FIG. 6B, an example of a reference table 640 for a structured document 600 having dynamically-rendered content is shown, according to one or more disclosed embodiments. As discussed above, there is only one cell (B7) in structured document 600 having dynamically-rendered content. In other words, the value of B7 at any given snapshot moment in time is dependent on backing formula 602, which relies on the current values of cells B2, B3, B4, and B5 (and the value of B7 will change over time as the values of those cells it refers to are updated). Each of the other cells in structured document 600 is determined only by the value of the cell itself. As will be explained in further detail below, according to some embodiments, constructing 635 a reference table, such as reference table 640, for the structured document may be a step in the process of applying to APC protections to structured documents having dynamically-rendered content. In particular, the reference table may trigger the APC process to calculate and store a 'snapshot' value of a dynamically-rendered cell any time that any 'referred-to' cell in the document is designated for protection/encryption/obfuscation, etc. by a sender/creator of the document. For example, via the aid of reference table 640, once the sender/creator of the document indicated a desire to protect the contents of cell B3 (which appears in the last row 642 of the 'Refers To?' column of reference table 640), the process would be able to determine that it needed to snapshot the value of cell B7 and replace its content in protected version of the document with the snapshotted value of cell B7.

Figure 7:
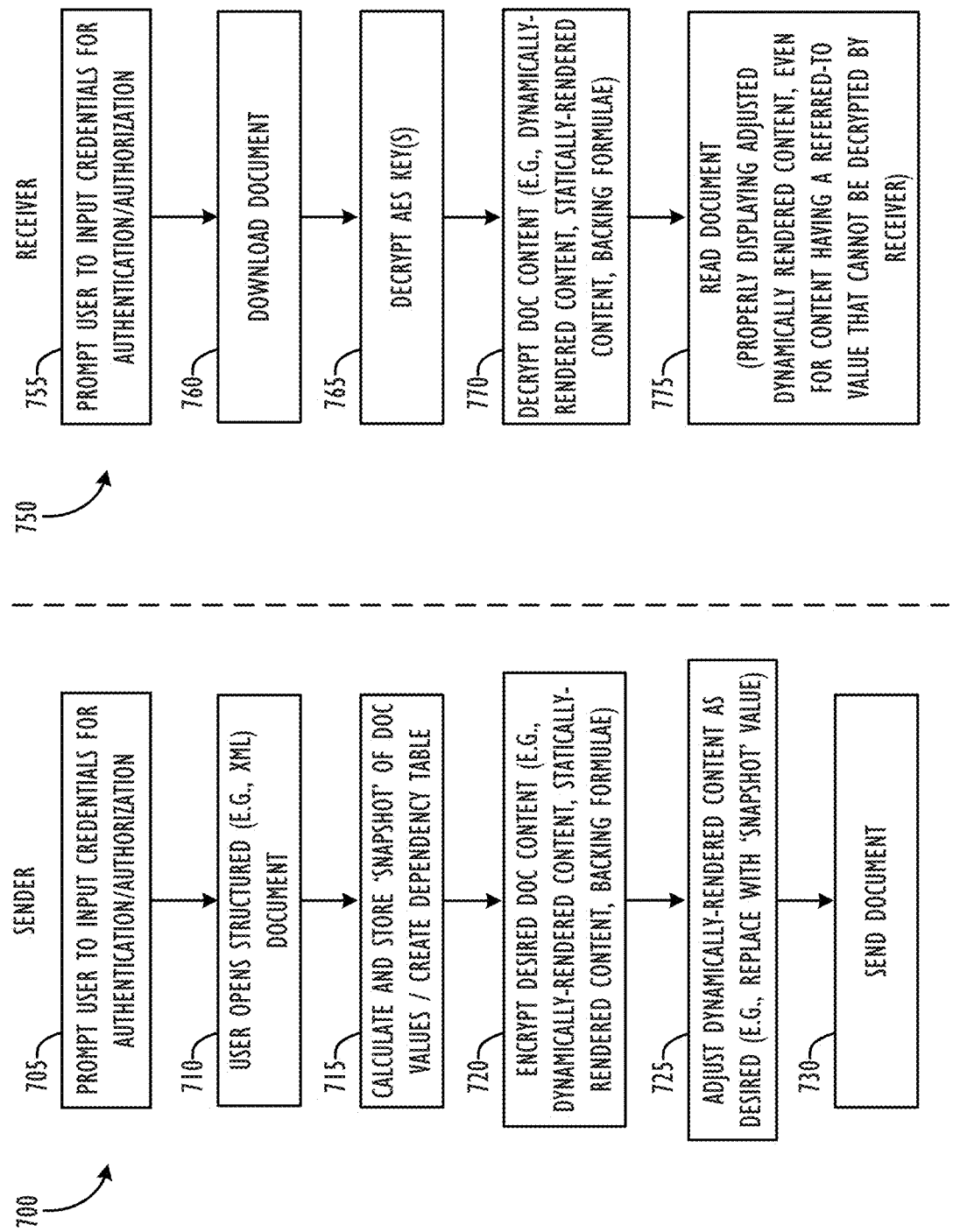
FIG. 7 shows a pair of flowcharts illustrating a method for utilizing an APC process on a structured document having dynamically-rendered content from both the sender and receiver perspective, according to one or more disclosed embodiments.

Referring now to FIG. 7, a pair of flowcharts 700 and 750 illustrating a method for utilizing an APC process on a structured document having dynamically-rendered content from both the sender and receiver perspective is shown, according to one or more disclosed embodiments. Beginning with flowchart 700 from the sender's perspective, first, the system prompts the sender to input his or her credentials for authentication (Step 705). Next, the sender opens the document and edits the document, e.g., by highlighting or otherwise selecting a portion(s) of the document and selecting particular recipients or groups of recipients to share access to that portion(s) of the document with (Step 710). Next, the process may calculate and store a 'snapshot' of all document values, which may also, in some embodiments, involve the construction of a dependency reference table, such as that described above with reference to FIG. 6B (Step 715). In the case of a spreadsheet document file type, Step 715 may, e.g., comprise calculating and rendering the values of each of the cells in the spreadsheet document by evaluating any relevant backing formulae, references, macros, etc. When finished, the sender may save the values and any changes made to the document.

Next, the system modifies the encryption keys for each portion of the document with different permissions settings (Step 720). Each portion of the document with different permissions settings may then be encrypted with a different AES key. As described above, in the case of a structured document comprising dynamically-rendered content, the protected encrypted portions of the document may comprise dynamically-rendered content, statically-rendered content, and/or backing formulae for dynamically-rendered content. Next, the process may adjust any dynamically-rendered content of the document that relies on or refers to a protected value as desired, e.g., by replacing such content with a snapshotted value of the content, as described above (Step 725). In other embodiments, an additional indicator may be added to the dynamically-rendered content in the document if the recipient user is viewing a snapshotted value of the content, as opposed to what the actual, 'true' dynamically-rendered value of the content would be (i.e., if the viewer had access to the full backing formula and any other content values relied upon by the backing formula). Finally, the sender uploads the document (including any encrypted, obfuscated, or otherwise adjusted portions) to the system for transmission over the network to the desired recipients in the desired format(s) (Step 730).

Attention is now directed to flowchart 750, which shows the process from the receiver's perspective. First, the system prompts the receiver to input his or her credentials for authentication (Step 755). Next, the receiver downloads the document or message that was sent to him or her (Step 760). Next, the receiver's client device decrypts the AES keys that he is able to with his private key (Step 765). Next, the receiver decrypts the protected document content that he has access to decrypt, e.g., dynamically-rendered content, statically-rendered content, and/or backing formulae for dynamically-rendered content, and places it in the correct portions of the structured document representation (Step 770). Finally, the receiver opens the document for reading and/or writing, but can only see the portions that he or she has access to (Step 775). As described above, the decrypted portions of the document that the reviver has access to may comprise adjusted dynamically-rendered content, e.g., snapshotted values of individual spreadsheet cells—even for content wherein the receiver does not have access to the content's backing formula (and/or wherein the receiver does not have access to other content values that are referred to by such backing formula). The remaining portions of the document remain scrambled to the receiver.

EXAMPLES

Example 1 is a non-transitory computer readable medium that comprises computer executable instructions stored thereon to cause one or more processing units to: obtain a first document, wherein the first document comprises a first plurality of content values; calculate present values for the first plurality of content values; store the calculated present values for the first plurality of content values; receive an indication of a first portion of the first document; receive a first permissions setting for the first portion; receive an indication of a first recipient for the first portion; generate a first encryption key for the first portion based, at least in part, on the first permissions setting for the first portion and the indicated first recipient of the first portion; encrypt the first portion using the first generated encryption key for the first portion; adjust a second portion of the first document, wherein the second portion of the first document refers to the first portion of the document in order to determine its content value; and transmit the first document to the first recipient.

Example 2 includes the subject matter of example 1, wherein the computer executable instructions further cause the one or more processing units to: receive an indication of a third portion of the first document; receive a second permissions setting for the third portion; receive an indication of a second recipient for the third portion; generate a second encryption key for the third portion based, at least in part, on the second permissions setting for the third portion and the indicated second recipient of the third portion; and encrypt the third portion using the second generated encryption key for the third portion; and adjust a fourth portion of the first document, wherein the fourth portion of the first document refers to the third portion of the document in order to determine its content value, wherein the first portion and the third portion of the first document are different.

Example 3 includes the subject matter of example 1, wherein the first portion comprises a spreadsheet cell in the first document.

Example 4 includes the subject matter of example 1, wherein the first portion comprises a spreadsheet cell referred to by a backing formula of another spreadsheet cell in the first document.

Example 5 includes the subject matter of example 1, wherein the first permissions setting comprises an indication that at least one of the following classes of recipients shall have access to the first portion of the first document: public, followers, particular contacts, user-defined groups.

Example 6 includes the subject matter of example 1, wherein the second portion comprises dynamically-rendered content.

Example 7 includes the subject matter of example 1, wherein adjusting the second portion of the first document converts the second portion from dynamically-rendered content into statically-rendered content.

Example 8 includes the subject matter of example 1, wherein adjusting the second portion of the first document comprises replacing the second portion of the first document with the stored calculated present value corresponding to the second portion.

Example 9 includes the subject matter of example 8, wherein the stored calculated present value corresponding to the second portion comprises the content value of the second portion at the moment the first document is transmitted to the first recipient.

Example 10 includes the subject matter of example 1, wherein the instructions further cause the one or more processing units to create a reference table for the first plurality of content values.

Example 11 is a system comprising: a memory; and one or more processing units, communicatively coupled to the memory, wherein the memory stores instructions to configure the one or more processing units to: obtain a first document, wherein the first document comprises a first plurality of content values; calculate present values for the first plurality of content values; store the calculated present values for the first plurality of content values; receive an indication of a first portion of the first document; receive a first permissions setting for the first portion; receive an indication of a first recipient for the first portion; generate a first encryption key for the first portion based, at least in part, on the first permissions setting for the first portion and the indicated first recipient of the first portion; encrypt the first portion using the first generated encryption key for the first portion; adjust a second portion of the first document, wherein the second portion of the first document refers to the first portion of the document in order to determine its content value; and transmit the first document to the first recipient.

Example 12 includes the subject matter of example 11, wherein the instructions are further configured to cause the one or more processing units to: receive an indication of a third portion of the first document; receive a second permissions setting for the third portion; receive an indication of a second recipient for the third portion; generate a second encryption key for the third portion based, at least in part, on the second permissions setting for the third portion and the indicated second recipient of the third portion; and encrypt the third portion using the second generated encryption key for the third portion; and adjust a fourth portion of the first document, wherein the fourth portion of the first document refers to the third portion of the document in order to determine its content value, wherein the first portion and the third portion of the first document are different.

Example 13 includes the subject matter of example 11, wherein the first portion comprises a spreadsheet cell in the first document.

Example 14 includes the subject matter of example 11, wherein the first portion comprises a spreadsheet cell referred to by a backing formula of another spreadsheet cell in the first document.

Example 15 includes the subject matter of example 11, wherein the first permissions setting comprises an indication that at least one of the following classes of recipients shall have access to the first portion of the first document: public, followers, particular contacts, user-defined groups.

Example 16 includes the subject matter of example 11, wherein the second portion comprises dynamically-rendered content.

Example 17 includes the subject matter of example 11, wherein adjusting the second portion of the first document converts the second portion from dynamically-rendered content into statically-rendered content.

Example 18 includes the subject matter of example 11, wherein adjusting the second portion of the first document comprises replacing the second portion of the first document with the stored calculated present value corresponding to the second portion.

Example 19 includes the subject matter of example 18, wherein the stored calculated present value corresponding to the second portion comprises the content value of the second portion at the moment the first document is transmitted to the first recipient.

Example 20 includes the subject matter of example 11, wherein the instructions further configure the one or more processing units to create a reference table for the first plurality of content values.

Example 21 is a computer-implemented method, comprising: obtaining a first document, wherein the first document comprises a first plurality of content values; calculating present values for the first plurality of content values; storing the calculated present values for the first plurality of content values; receiving an indication of a first portion of the first document; receiving a first permissions setting for the first portion; receiving an indication of a first recipient for the first portion; generating a first encryption key for the first portion based, at least in part, on the first permissions setting for the first portion and the indicated first recipient of the first portion; encrypting the first portion using the first generated encryption key for the first portion; adjusting a second portion of the first document, wherein the second portion of the first document refers to the first portion of the document in order to determine its content value; and transmitting the first document to the first recipient.

Example 22 includes the subject matter of example 21, further comprising: receiving an indication of a third portion of the first document; receiving a second permissions setting for the third portion; receiving an indication of a second recipient for the third portion; generating a second encryption key for the third portion based, at least in part, on the second permissions setting for the third portion and the indicated second recipient of the third portion; and encrypting the third portion using the second generated encryption key for the third portion; and adjusting a fourth portion of the first document, wherein the fourth portion of the first document refers to the third portion of the document in order to determine its content value, wherein the first portion and the third portion of the first document are different.

Example 23 includes the subject matter of example 21, wherein adjusting the second portion of the first document converts the second portion from dynamically-rendered content into statically-rendered content.

Example 24 includes the subject matter of example 21, wherein adjusting the second portion of the first document comprises replacing the second portion of the first document with the stored calculated present value corresponding to the second portion.

Example 25 includes the subject matter of example 24, wherein the stored calculated present value corresponding to the second portion comprises the content value of the second portion at the moment the first document is transmitted to the first recipient.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon to cause one or more processing units to:
   obtain a first document, wherein the first document comprises a first plurality of content values;
   calculate present values for the first plurality of content values;
   store the calculated present values for the first plurality of content values;
   receive an indication of a first portion of the first document;
   receive a first permissions setting for the first portion;
   receive an indication of a first recipient for the first portion;
   generate a first encryption key for the first portion based, at least in part, on the first permissions setting for the first portion and the indicated first recipient of the first portion;
   encrypt the first portion using the first generated encryption key for the first portion;
   adjust a second portion of the first document, wherein the second portion of the first document refers to the first portion of the document in order to determine its content value, wherein adjusting the second portion of the first document comprises converting the second portion from dynamically-rendered content into statically-rendered content;
   receive an indication of a third portion of the first document;
   receive a second permissions setting for the third portion;
   receive an indication of a second recipient for the third portion;
   generate a second encryption key for the third portion based, at least in part, on the second permissions setting for the third portion and the indicated second recipient of the third portion; and
   encrypt the third portion using the second generated encryption key for the third portion; and
   adjust a fourth portion of the first document, wherein the fourth portion of the first document refers to the third portion of the document in order to determine its content value,
   wherein the first portion and the third portion of the first document are different; and
   transmit the first document to the first recipient.

2. The non-transitory computer readable medium of claim 1, wherein the first portion comprises a spreadsheet cell in the first document.

3. The non-transitory computer readable medium of claim 1, wherein the first portion comprises a spreadsheet cell referred to by a backing formula of another spreadsheet cell in the first document.

4. The non-transitory computer readable medium of claim 1, wherein the first permissions setting comprises an indication that at least one of the following classes of recipients shall have access to the first portion of the first document: public, followers, particular contacts, and user-defined groups.

5. The non-transitory computer readable medium of claim 1, wherein the second portion comprises a spreadsheet cell whose value is determined, at least in part, by evaluating one or more formulae, references, or macros.

6. The non-transitory computer readable medium of claim 1, wherein adjusting the second portion of the first document further comprises: replacing the second portion of the first document with the stored calculated present value corresponding to the second portion and removing any formulae, references, or macros corresponding to the second portion.

7. The non-transitory computer readable medium of claim 6, wherein the stored calculated present value corresponding to the second portion comprises the content value of the second portion at the moment the first document is transmitted to the first recipient.

8. The non-transitory computer readable medium of claim 1, wherein the instructions further cause the one or more processing units to create a reference table for the first plurality of content values.

9. A system, comprising:
   a memory; and
   one or more processing units, communicatively coupled to the memory, wherein the memory stores instructions to configure the one or more processing units to:
      obtain a first document, wherein the first document comprises a first plurality of content values;
      calculate present values for the first plurality of content values;
      store the calculated present values for the first plurality of content values;
      receive an indication of a first portion of the first document;

receive a first permissions setting for the first portion;
receive an indication of a first recipient for the first portion;
generate a first encryption key for the first portion based, at least in part, on the first permissions setting for the first portion and the indicated first recipient of the first portion;
encrypt the first portion using the first generated encryption key for the first portion;
adjust a second portion of the first document, wherein the second portion of the first document refers to the first portion of the document in order to determine its content value, wherein adjusting the second portion of the first document comprises converting the second portion from dynamically-rendered content into statically-rendered content;
receive an indication of a third portion of the first document;
receive a second permissions setting for the third portion;
receive an indication of a second recipient for the third portion;
generate a second encryption key for the third portion based, at least in part, on the second permissions setting for the third portion and the indicated second recipient of the third portion; and
encrypt the third portion using the second generated encryption key for the third portion; and
adjust a fourth portion of the first document, wherein the fourth portion of the first document refers to the third portion of the document in order to determine its content value,
wherein the first portion and the third portion of the first document are different; and
transmit the first document to the first recipient.

10. The system of claim 9, wherein the first portion comprises a spreadsheet cell in the first document.

11. The system of claim 9, wherein the first portion comprises a spreadsheet cell referred to by a backing formula of another spreadsheet cell in the first document.

12. The system of claim 9, wherein the first permissions setting comprises an indication that at least one of the following classes of recipients shall have access to the first portion of the first document: public, followers, particular contacts, and user-defined groups.

13. The system of claim 9, wherein the second portion comprises a spreadsheet cell whose value is determined, at least in part, by evaluating one or more formulae, references, or macros.

14. The system of claim 9, wherein adjusting the second portion of the first document comprises: replacing the second portion of the first document with the stored calculated present value corresponding to the second portion and removing any formulae, references, or macros corresponding to the second portion.

15. The system of claim 14, wherein the stored calculated present value corresponding to the second portion comprises the content value of the second portion at the moment the first document is transmitted to the first recipient.

16. The system of claim 9, wherein the instructions further configure the one or more processing units to create a reference table for the first plurality of content values.

17. A computer-implemented method, comprising:
obtaining a first document, wherein the first document comprises a first plurality of content values;
calculating present values for the first plurality of content values;
storing the calculated present values for the first plurality of content values;
receiving an indication of a first portion of the first document;
receiving a first permissions setting for the first portion;
receiving an indication of a first recipient for the first portion;
generating a first encryption key for the first portion based, at least in part, on the first permissions setting for the first portion and the indicated first recipient of the first portion;
encrypting the first portion using the first generated encryption key for the first portion;
adjusting a second portion of the first document, wherein the second portion of the first document refers to the first portion of the document in order to determine its content value, wherein adjusting the second portion of the first document comprises converting the second portion from dynamically-rendered content into statically-rendered content;
receiving an indication of a third portion of the first document;
receiving a second permissions setting for the third portion;
receiving an indication of a second recipient for the third portion;
generating a second encryption key for the third portion based, at least in part, on the second permissions setting for the third portion and the indicated second recipient of the third portion; and
encrypting the third portion using the second generated encryption key for the third portion; and
adjusting a fourth portion of the first document, wherein the fourth portion of the first document refers to the third portion of the document in order to determine its content value,
wherein the first portion and the third portion of the first document are different; and
transmitting the first document to the first recipient.

18. The method of claim 17, wherein the first portion comprises a spreadsheet cell referred to by a backing formula of another spreadsheet cell in the first document.

19. The method of claim 17, wherein adjusting the second portion of the first document further comprises: replacing the second portion of the first document with the stored calculated present value corresponding to the second portion and removing any formulae, references, or macros corresponding to the second portion.

20. The method of claim 19, wherein the stored calculated present value corresponding to the second portion comprises the content value of the second portion at the moment the first document is transmitted to the first recipient.

21. The method of claim 17, wherein the first permissions setting comprises an indication that at least one of the following classes of recipients shall have access to the first portion of the first document: public, followers, particular contacts, and user-defined groups.

22. The method of claim 17, wherein the second portion comprises a spreadsheet cell whose value is determined, at least in part, by evaluating one or more formulae, references, or macros.

* * * * *